US011549045B2

(12) United States Patent
Smith

(10) Patent No.: US 11,549,045 B2
(45) Date of Patent: Jan. 10, 2023

(54) MANAGED PRESSURE DRILLING WITH NOVEL NONCOMPRESSIBLE LIGHT WEIGHT FLUID

(71) Applicant: Highland Fluid Technology, Inc., Houston, TX (US)

(72) Inventor: Kevin W. Smith, Bellaire, TX (US)

(73) Assignee: Highland Fluid Technology, Inc., Houston, TX (US)

( * ) Notice: Subject to any disclaimer, the term of this patent is extended or adjusted under 35 U.S.C. 154(b) by 178 days.

(21) Appl. No.: 16/916,625

(22) Filed: Jun. 30, 2020

(65) Prior Publication Data

US 2021/0002538 A1    Jan. 7, 2021

Related U.S. Application Data

(60) Provisional application No. 62/878,991, filed on Jul. 26, 2019, provisional application No. 62/869,138, filed on Jul. 1, 2019.

(51) Int. Cl.
*C09K 8/34* (2006.01)
*E21B 21/06* (2006.01)
*E21B 21/08* (2006.01)

(52) U.S. Cl.
CPC ............ *C09K 8/34* (2013.01); *E21B 21/062* (2013.01); *E21B 21/08* (2013.01)

(58) Field of Classification Search
CPC .......... C09K 8/34; E21B 21/062; E21B 21/08
See application file for complete search history.

(56) References Cited

U.S. PATENT DOCUMENTS 4,530,402 A * 7/1985 Smith .................. C09K 8/424
166/291
4,659,486 A   4/1987 Harmon
(Continued)

FOREIGN PATENT DOCUMENTS

| WO | 199704038 A1 | 2/1997 |
| WO | 2004053017 A1 | 6/2004 |
| WO | 2008083063 A2 | 7/2008 |

OTHER PUBLICATIONS

Petrofree MSDS printed May 13, 2022 7 pages (Year: 2022).*
(Continued)

*Primary Examiner* — Alicia Bland
(74) *Attorney, Agent, or Firm* — Vorys, Sater, Seymour and Pease LLP; William L. Krayer

(57) ABSTRACT

A very light weight, noncompressible drilling fluid including a very light weight hydrocarbon base liquid, and a styrenic butadiene diblock copolymer is heated to achieve excellent rheology including thixotropicity, making an effective drilling fluid with a density of 8 pounds per gallon or less. Densities as low as 4 pounds per gallon are achieved with the addition of glass bubbles. The glass bubbles may, but normally will not, exceed 50% by volume. A method of making the drilling fluid includes passing the light weight liquid and the copolymer through a cavitation device. The invention includes drilling and with and recirculating the fluid to maintain the desired density, viscosity and rheology by adjusting the ingredients accordingly. A method of managed pressure drilling employs the novel fluid, enabling control of drill pressure and physical properties of the fluid including equivalent circulating density.

9 Claims, 2 Drawing Sheets

(56) References Cited

U.S. PATENT DOCUMENTS

| | | | |
|---|---|---|---|
| 5,883,054 A | | 3/1999 | Hernandez et al. |
| 6,017,854 A | * | 1/2000 | Van Slyke ............... C09K 8/62 |
| | | | 507/221 |
| 6,814,142 B2 | | 11/2004 | Paulk et al. |
| 6,906,009 B2 | | 6/2005 | Shinbach et al. |
| 7,767,629 B2 | | 8/2010 | Shinbach et al. |
| 8,034,749 B2 | | 10/2011 | Alsobrook et al. |
| 9,279,299 B2 | | 3/2016 | Lovora |
| 9,688,902 B2 | | 6/2017 | Kilkarni et al. |
| 10,053,609 B2 | | 8/2018 | Bening et al. |
| 10,258,944 B2 | | 4/2019 | Smith et al. |
| 2007/0215346 A1 | | 9/2007 | Sloan et al. |
| 2009/0139771 A1 | | 6/2009 | Smith et al. |
| 2009/0143253 A1 | | 6/2009 | Smith et al. |
| 2011/0303412 A1 | * | 12/2011 | Frantz ................... C04B 28/001 |
| | | | 106/285 |
| 2015/0308204 A1 | | 10/2015 | Johnson et al. |
| 2015/0322351 A1 | | 11/2015 | Hoek et al. |
| 2016/0339400 A1 | | 11/2016 | Smith et al. |
| 2017/0136427 A1 | | 5/2017 | Smith |
| 2019/0031793 A1 | | 1/2019 | Smith |

OTHER PUBLICATIONS

Schlumberger Online Dictionary definition "organophilic clay" printed May 12, 2022 2 pages (Year: 2022).*

Hussain I. AlBahrani, A. S. Yami, and M. Amanullah; "Investigation of the Reliability of Hollow Glass Spheres as a Density Reduction Agent for Drilling Fluids under Impact Forces Simulating Drilling Conditions"; SPE-182973-MS; pp. 1 and 2. Abu Dhabi International Petroleum Exhibition & Conference Nov. 7-10, 2016.

Zimuzor Okafor, Shannon Higgins-Borchardt, Goka Akinniranya, Tom Bratton, and Danny Boone; "Managed-Pressure Drilling Using a Parasite Aerating String"; SPE 119964-PA; SPE Drilling & Completion; v. 25, issue 4, Dec. 2010.

Adam Wilson, "Case Study Shows Benefits of Applying Hollow Glass Spheres to Drilling Fluids"; Jour. Petroleum Technology; Nov. 1, 2015; p. 78-79.

Manohar Lal, "Shale Stability: Drilling Fluid Interaction and Shale Strength"; SPE 54356; 1999.

Peng Xu, Han-qiao Xiong, Xiao-lin Pu, Ju-quan Liu, and Xing Liu; "Polymer Drilling Fluid with Micron-Grade Cenosphere for Deep Coal Seam"; Journal of Chemistry v. 2015; Article ID967653; Aug. 16, 2015.

"Basic Understanding of Underbalanced Drilling" by DrillingFormulas. com; Nov. 23, 2017. www.drillingformulas.com/basic-understanding-of-underbalanced-drilling/.

Kenneth P. Malloy et al.; "Managed Pressure Drilling: What it is and What it is Not"; IADC/SPE 122281; San Antonio Texas Feb. 12-13, 2009.

J. Saponja, A. Adeleye and B. Hucik; "Managed Pressure Drilling (MPD) Field Trials Demonstrate Technology Value"; IADC/SPE 98787; Feb. 21-23, 2006.

George H. Medley, Jr., William C. Maurer, and Ali Y. Garkasi; "Use of Hollow Glass Spheres for Underbalanced Drilling Fluids"; SPE30500; Dallas Conference and Expo, Oct. 1995.

Simone Lumsden, John P. Singh, Ronnie G. Morgan and Gregory Hundt; "Rheological Characterization of Suspension of Hollow Glass Beads"; SPE Journal; Oct. 2017, pp. 1671-1680.

Deepak M. Gala and Julmar ShaunToralde; "Managed Pressure Drilling 101: Moving Beyond 'It's Always Been Done That Way'"; Jan. 15, 2011. www.spe.org/en/print-article/?art=645.

Philip Frink; "Managed Pressure Drilling—What's in a Name?"; Drilling Contractor; Mar./Apr. 2006 pp. 36-39.

International Search Report and Written Opinion by the International Searching Authority, dated Oct. 7, 2020, in the PCT Application No. PCT/US2020/040276.

Written Opinion of the International Searching Authority for PCT/US2020/040276; dated Dec. 28, 2021.

International Preliminary Report on Patentability for PCT/US2020/040276; dated Dec. 28, 2021.

* cited by examiner

MANAGED PRESSURE DRILLING WITH NOVEL NONCOMPRESSIBLE LIGHT WEIGHT FLUID

CROSS REFERENCE TO RELATED APPLICATIONS

This application claims the full benefit of (1) U.S. Provisional Application 62/869,138 filed Jul. 1, 2019 titled Lightweight Nonaqueous Drilling Fluid and Methods of Making It and (2) U.S. Provisional Application 62/878,991 filed Jul. 26, 2019 titled Managed Pressure Drilling with Noncompressible Lightweight Fluid.

TECHNICAL FIELD

A very light weight drilling fluid is made without using gas or aerogel. Since the fluid is noncompressible, compressors are not necessary at the drilling site. The fluid, including a very light weight hydrocarbon base liquid, a styrenic butadiene diblock copolymer and an organoclay, is heated to achieve excellent rheology including thixotropicity, making an effective drilling fluid with a density of 8 pounds per gallon or less. Densities as low as 4 pounds per gallon are achieved with the addition of glass bubbles. The glass bubbles normally will not exceed 50% by volume. The invention includes the recirculation of the fluid to maintain the desired density by adjusting the ingredients accordingly. A method of managed pressure drilling employs the novel fluid, enabling control of drill pressure and physical properties of the fluid including equivalent circulating density.

BACKGROUND OF INVENTION

Nonaqueous drilling fluids, typically based on oil or other hydrocarbons, have been used instead of water-based fluids for many years in various circumstances and for many reasons, one of them being the relatively light weight of oil and related compositions such as petroleum derivatives, compared to the density of water. However, it is generally more difficult to include various additives in the oil-based materials and to adjust other properties, such as viscosity. Drilling fluids must be good at lubricating the drill bit and carrying away the cuttings, among other basic functions. Numerous additives and adjustments to the physical properties of drilling fluids have been tried in the past to accomplish these diverse ends.

In the recovery of hydrocarbons from the earth, drilling fluids are typically water-based or oil-based mud (WBM, OBM). Both OBM and WBM have densities greater than the weight of water, but there is a need for drilling fluids that weigh less than typical WBM and OBM drilling fluids. Oil-based mud includes emulsions where oil is the continuous phase and water the discontinuous phase. Both WBM and OBM can be weighted with salts or barite to maintain enough hydrostatic pressure to prevent the uncontrolled release of hydrocarbons from the well. Too much hydrostatic weight creates drilling problems such as mud losses and damage to producing reservoirs. Managed pressure drilling (MPD) mitigates those problems by maintaining the drilling fluid at or below the pore pressure of the reservoir. MPD typically requires a rotating head, a manifold of pressure chokes and a pump to add backpressure to the annulus of the well. Instead of adding barite to increase the density of the mud, hydrostatic pressure can be added by pressurizing the annulus. MPD provides the control to drill safely while keeping the mud from being lost to the formation to prevent both lost circulation and reservoir contamination. Managed Pressure Drilling (MPD), like Underbalanced Drilling (UD), is well known and has been in widespread use for decades.

There are lost circulation zones and reservoirs with pore pressures below the hydrostatic weight of even water. Until now gas has been used to lighten the hydrostatic column of drilling fluid. Drilling with a compressed gas can speed up the drilling process, and air or nitrogen can even replace WBM or OBM mud as the drilling fluid, but air drilling is typically limited to shallow wells. Aerated or nitrified fluids and foam are commonly used when a 3 to 9 ppg fluid is needed. The gas is injected into WBM or OBM to lighten the column. Injecting gas complicates the drilling process and adds Health, Safety and Environmental (HSE) issues. Compressed gas is defined by the Ideal Gas Law, $PV=nRT$. Volume changes with pressure and temperature. The fluid density in the annulus is a gradient. There is more pressure at the drill bit at the bottom of the hole and less pressure at the top of the hole. Gas lightens the fluid, but also changes the fluid properties from the bottom of the hole to the top of the hole making it harder to predict fluid properties such as rheology. Conventional WBM and OBM rheology is generally, and easily, determined at ambient pressure by a Couette Type Rheometer such as a Fann 35 or OFITE 900, but rheology of a fluid containing gas can only be measured in a pressurized rheometer. The volume of gas changes the rheology; therefore to accurately define the fluid you need to know the downhole pressure to calculate the gas volume part of the fluid, and you need to know how the pressure is changing from the drill bit to the surface to know the fluid rheology at a given point in the annulus. If the gas expands too much, the rheology needed to suspend the cuttings will be lost, and the drill pipe can get stuck in the hole from the cuttings packing around the drill pipe.

While the complications of determining fluid properties of a foam or aerated fluid can be overcome with specialized equipment, it also takes equipment to make enough air or nitrogen to drill. The equipment is driven by large engines that consume considerable fuel and space. The minimum equipment required are 2 screw compressors that feed a high-pressure booster to generate sufficient volumes of air up to 2500 psi. Membrane nitrogen is safer to use because it prevents downhole fires, but nitrogen requires double the screw compressor volume. The membrane separates oxygen from air to make a 95+ percent nitrogen onsite. To increase the working pressure to 4,000 psi requires a "super" booster downstream of the conventional booster. A full package might consist of 6 screw compressors, a membrane nitrogen unit, a booster and a super booster. Total horsepower can easily exceed 3,000 HP. Drilling with compressed gas also adds a considerable equipment footprint and complicates the drilling process. Part of the drilling process is to remove the cuttings from the drilling fluid as it is circulated out of the wellbore. Drilling with compressed gas requires 3 and 4 phase separators to handle the expanding gas and separate the drill cuttings from the aerated or nitrified fluid. Furthermore, there are significant health, safety and environmental (HSE) issues. An incompressible fluid under pressure is dangerous, but compressed gas is much more dangerous due to the expansion of the gas when released. Adding 6 to 10 pieces of equipment to the drilling process adds more fuel consumption, more emissions, more complexity, more maintenance and requires more people.

Some of the extra cost of drilling with a compressible fluid is offset by drilling faster and with fewer problems. In the field of hydrocarbon recovery, WBM and OBM drilling fluids have been found to cause various types of damage to the wellbore, particularly in shale formations which are susceptible to fracture under the stresses caused by the drill bit and the pressure of the fluid itself. Drilling fluids containing water are heavy, which contributes to the pressure on the exposed formation, but also the drill bit and its essential string demonstrate a disadvantageous buoyancy in dense fluid, often requiring an otherwise undesirable increase in energy and force applied to the drill bit.

A simple method to calculate buoyancy is to use an oilfield buoyancy factor, BF. Steel has an attributed weight of 66.5 ppg (pounds per gallon) and the calculated BF is (66.5−Mud Weight)/66.5. If the Mud Weight (drilling fluid weight) is a typical 14.5 ppg then BF=0.78, but if the Mud Weight is 5 ppg, the BF is 0.91. You can calculate the string weight in the mud by multiplying BF by pipe weight and length. Assume the drill pipe weighs 300,000 pounds. That means a 5 ppg fluid has 273,000 pounds of weight on the bit. Conversely a 14.5 ppg mud only has 234,000 pounds of weight on the bit. While weight on the bit is not the only factor in drilling faster, generally more weight is better, and a low density fluid reduces the buoyancy effect on the drill string as compared to a more dense fluid.

An incompressible fluid that replaces the extra equipment used to generate gas would be a benefit. Such a fluid should still have the advantages of drilling faster with fewer problems, have the advantage of less equipment, easy conventional rigsite rheology measurements and would utilize conventional mud reconditioning equipment.

Surprisingly, no such, incompressible, lightweight fluid exists. The industry has used glass bubbles to lighten WBM and OBM. Direct emulsions are used where water is the continuous phase and oil is the high-internal phase such that the resulting fluid weighs slightly less than water. Neither solution is light enough to replace compressed air and nitrogen used for drilling. A fluid is needed to replace those aerated and nitrified fluids.

While Managed Pressure Drilling (MPD) has notably ameliorated the problems of non-productive time, such as resuming drilling after a pipe insertion, aerated or nitrified fluids continue to add difficulty to the process. A noncompressible fluid having a density of 8 pounds per gallon or less can uniquely respond to pressure controls almost immediately throughout the circulating system. My invention beneficially employs such a fluid in an underbalanced (UB) or managed pressure drilling (MPD) operation, controlling the drilling fluid pressure as a function of pore pressure, or to maintain a desired equivalent circulation density (ECD). Such control of pressure has heretofore been impossible in a drilling system utilizing a drilling fluid of 8 ppg or lower.

BRIEF SUMMARY OF THE INVENTION

A very light weight drilling fluid is made without using gas or aerogel. Since the fluid is noncompressible, gas separators, compressors and related equipment are not necessary at the drilling site. The fluid, including a very lightweight hydrocarbon base and a styrenic butadiene diblock copolymer, is heated, during mixing, during drilling, or otherwise, to achieve, as a single phase fluid, excellent viscosity, making an effective drilling fluid with a density of 8 pounds per gallon or less. Other additives include organoclays, surfactants and viscosity thinning dispersants. Densities as low as 4 pounds per gallon are achieved with the addition of glass bubbles. The glass bubbles may amount to 50% or more (more than 50% is possible but 60% approaches compactness, which is impractical) by volume; organoclay and/or surfactants are added to assist in dispersing and pumping them. The invention includes the recirculation of the fluid to maintain the desired density by adjusting the ingredients accordingly.

The invention also includes a method of drilling a well wherein a noncompressible base drilling fluid having a density no greater than 8 ppg (the density of water) is employed at controlled pressures which may be rapidly and responsively varied over a wide range of pressures. The drilling fluid pressure may be controlled as a function of pore pressure in the manner of Managed Pressure Drilling (MPD). Equivalent Circulation Density (ECD) is also readily controlled using the low-density fluid. The quick-response ability to control downhole pressures with a noncompressible light weight fluid is also useful in Underbalanced Drilling (UB).

I have found that such a lightweight fluid is practical and can be made thixotropic to drill in a manner comparable to conventional OBM and WBM. Furthermore, the base fluid can weigh between 4 ppg to 8 ppg by using a GTL (gas to liquid) base oil (Light Weight Synthetic Hydrocarbon Liquid, or sometimes herein LWSHL) made by Shell Oil Company that starts with a specific gravity of 0.7 to 0.8 (it is typically 0.75) or 6.0 ppg to 6.5 ppg (typically 6.25 ppg); however, LWSHL is not a viscous fluid, which is necessary for drilling.

Over the past two decades, a family of styrenic diblock copolymers has been developed and applied to hydrocarbon-based drilling fluids, as described, for example, in Van Slyke U.S. Pat. No. 6,017,854 and, more recently, in Bening et al U.S. Pat. No. 10,053,609 owned by Kraton Polymers LLC. It has been found, however, that it is very difficult in practice to create a combination of these polymers with appropriate drilling fluid components that efficiently accomplishes the desired control of rheology for use in drilling, regardless of its density.

I have found that styrenic butadiene (SB) diblock copolymers available from Kraton Corporation (Houston, Tex., USA) can be made to work to create a stable, lightweight fluid by heating them in the presence of the GTL liquid described above or similar light hydrocarbons. The heat— for example, 150° F.—causes the styrenic butadiene diblock copolymer to yield viscosity, providing a rheology well suited to drilling. Any conventional method of heating may be used, including relying on formation temperatures and heat generated in the drilling process, but a convenient method combining accelerated heating with excellent mixing is to pass the combined ingredients through a cavitation device. This method of making my drilling fluid is also part of my invention. The resulting low density, thixotropic fluid is excellent for use where lightweight drilling fluids are desired. The two basic components—the LWSHL liquid and the SB diblock copolymer—form a single phase fluid having the desired thixotropic properties. A third component, an organoclay or other organically modified phyllosilicate, may be added to maintain rheological properties during use. "Organically modified" means at least some of the original cations of the phyllosilicate surface layer(s) have been replaced by organic cations such as quaternaries.

The very light weight combination of LWSHL and 1% to 60% by volume glass bubbles is itself a novel composition.

The thixotropic properties of the LWSHL/SB copolymer composition may be further managed by the addition of any of (a) organoclay or other organically modified phyllosilicate, (b) stearate or other fatty acid compounds, (c) surfactants, (d) viscosity-thinning dispersants such as propylene carbonate or oleoyl amine with 2 moles of EO, or (e) mixtures thereof. The fluid may be advantageously further reduced in density by the addition of incompressible light bodies such as hollow glass bubbles. To retain the glass bubbles in suspension in the light liquid base, while maintaining the required thixotropic properties (rheology), an effective amount of organoclay or other phyllosilicate such as Garamite is added. Because even very small glass bubbles generate friction by colliding with and rubbing on each other as they move in the fluid, they absorb energy. This is reflected in increased viscosity, which increases the equivalent circulation density (ECD). Past attempts to decrease densities in conventional drilling fluids by adding more glass bubbles have been somewhat frustrated by this viscosity-increasing effect. By using a very low density base or carrier liquid such as GTL, I am able to achieve even lower densities with manageable amounts of glass bubbles. Also, I have found that the addition of organically modified phyllosilicate, fatty acid dispersants such as divalent metal salts of stearic or oleic acid, or surfactants derived from such fatty acids, noticeably reduce contact and friction between the glass bubbles, thus reducing viscosity and ECD.

A novel method of drilling a well includes monitoring the density and rheology of the circulating fluid and continuously or intermittently replenishing glass bubbles lost by attrition. Rheology is maintained by the addition of polymer and/or other additives mentioned above as needed. As used herein with reference to the monitoring and regulating of rheology by adjusting various ingredients, the term "rheology" means flow properties including thixotropicity and viscosity over a range of temperatures, pressures and surface interactions.

DETAILED DESCRIPTION OF THE INVENTION

Figure 1:
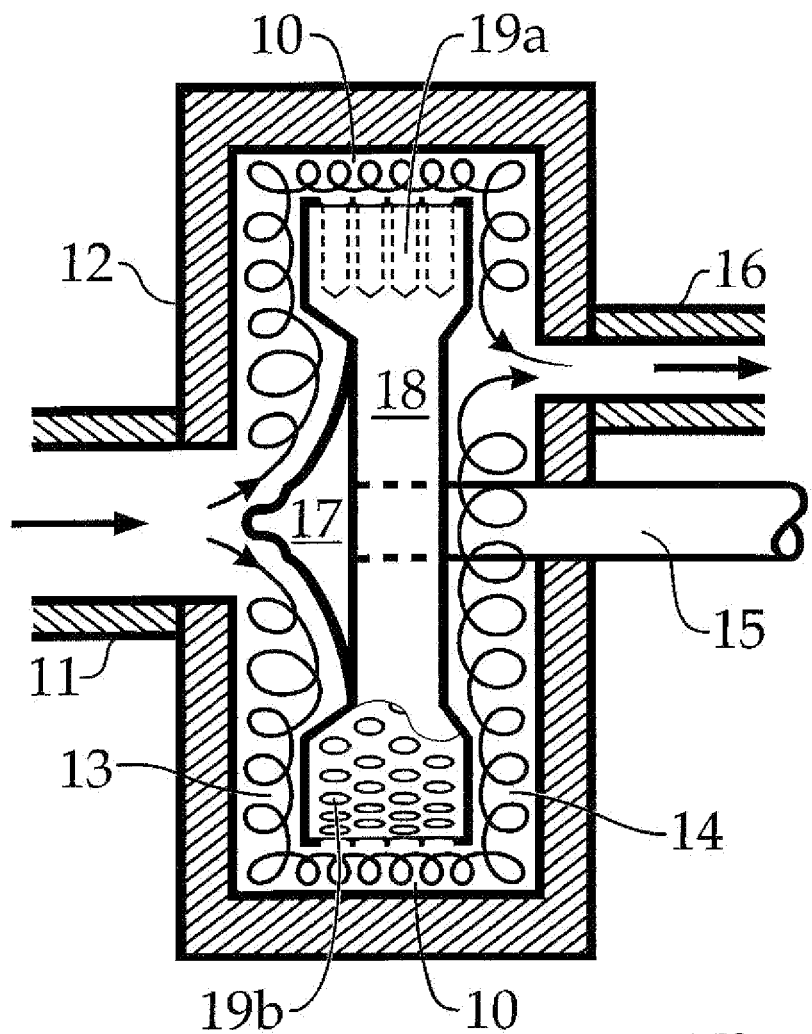
FIG. 1 is a sectional view of a cavitation device useful for mixing and heating the LWSHL and the styrene butadiene diblock copolymer with or without other ingredients of the drilling fluid.

Heating a mixture of Light Weight Synthetic Hydrocarbon Liquid (LWSHL) and 0.1-5% by weight styrenic butadiene diblock copolymer (SBDC) to a temperature of at least 140 degrees F. will make a thixotropic fluid useful in drilling wells. Simple heating with mixing as with an impeller will work, but is not readily adapted to the practical needs of drillers on site, nor can it guarantee the most efficient and thorough mixing.

I have found that, by using deliberately induced cavitation in a defined mixture, I am able to create a light weight drilling fluid that is thixotropic and readily adapted to the needs of the drilling art. The base of the drilling fluid is a light weight petroleum derivative. To this is added from 0.1% to 5% by weight of a styrenic diblock polymer with butadiene. The components (light weight liquid natural gas derivative and styrene-butadiene diblock polymer), with or without additional components mentioned elsewhere herein, are fed to a cavitation device which may be as is disclosed in US Patent Publication 2007/0215346 (see FIG. 8), my U.S. patent application Ser. No. 15/221,878 (FIG. 8 or 13), or my U.S. patent application Ser. No. 16/118,659, where the cavitation devices are used for purposes different from that herein. The cavitation device, such as in FIG. 1, to be described further below, is generally a cylindrical rotor inside of a housing having a closely conforming cylindrical internal surface. The cylindrical rotor has a plurality of dead-end cavities bored into its cylindrical surface. The housing has an inlet and an outlet, so that, when a combined fluid (which may contain solids) is fed into it and the cylinder is appropriately rotated, the fluid tends to fall into the cavities but is immediately thrown out by centrifugal force, creating a vacuum or partial vacuum which is immediately filled by the fluid. The ensuing pockets of mini-implosions are highly effective in generating heat and mixing the contents of the fluid. As applied to the present invention, the thoroughly mixed and heated ingredients exhibit excellent thixotropic properties which are highly beneficial in a drilling fluid. Cavitation has the added benefit of completely oil wetting the hollow glass bubbles (to be described below) in one step as part of the heating and mixing step.

A novel method of drilling a well includes monitoring the density and rheology of the circulating fluid and continuously replenishing glass bubbles lost by attrition to maintain the desired density. Rheology is maintained by the addition of base polymer and organoclay (organically modified phyllosilicate) as needed.

Broadly, managed pressure drilling includes any process wherein the hydrostatic pressure of the drilling fluid is controlled as a function of the pore pressure in the formation surrounding the bore hole. As this definition implies, the controlled pressure may be greater than, or less than the pore pressure depending on circumstances and the objectives of the operators. My invention includes a method of managed pressure drilling wherein the drilling fluid is a noncompressible base fluid having a density of 8 pounds per gallon or less. Put another way, my invention includes a method of drilling a well comprising drilling the well with a low density noncompressible drilling fluid while monitoring the pore pressure surrounding the well and controlling the drilling fluid pressure as a function of the monitored pore pressure. While I have identified several suitable drilling fluids herein, I do not intend to be limited to them—any noncompressible drilling fluid whose base has a density of 8 ppg or lower may be used. Fluids which contain deliberately injected gases, aerogels or the like are compressible and not useful in my invention.

Schlumberger's Johnson et al US Patent Publication 2015/0308204 describes a managed pressure drilling process in which gas is injected into the drilling fluid, in part to adjust the density of the fluid, and hence the bottom hole pressure. This practice, seen in other publications (a so-called parasitic aerating string, for example, inserts gas some distance below the rig) and in the field, however, suffers from the difficulty of regulating the fluid density from a great distance (from the point of injection at the well site to the bottom hole) and where very high column pressures must be overcome. Gas is compressible, so both the volume and the density of the fluid vary considerably from the rig site to the bottom hole; the system's response time approaches the ponderous, the system remains vulnerable to "kicks," and the results are imprecise. By using my light noncompressible fluid, my invention enables the operator to achieve almost instantaneous response to a change of pressure. The advantages of a noncompressible fluid are evident even when some of the fluid is dissipated into the formation fissures. Even after drilling has been halted for insertion of pipe or for any other purpose, my drilling fluid, which is not only noncompressible but is single phase (free of gas) and thixotropic, permits the operator to speedily regain normal drilling procedures.

As is well known, overbalanced drilling (OB) entails maintaining hydrostatic pressure in the well bore higher than the formation pressure. The growing use of underbalanced drilling (UB) for various reasons does the opposite—maintaining a hydrostatic pressure in the wellbore lower than the formation pressure, notably to permit production while drilling. In either case, the regulation of bottom hole pressure requires taking into account the distance from the point, on the surface, of the application of pressure to the bottom hole. Whether or not chokes are used, my noncompressible, thixotropic fluid not only accurately and quickly transmits alterations in pressure to the bottom hole but also enables ready resumption of drilling after a cessation of drilling for any reason such as, commonly, insertion of additional piping. The fluid's light weight is an important factor in the application of underbalanced drilling principles.

My invention also includes a method of drilling a well comprising (a) rotating a drill bit to drill a bore (b) circulating a drilling fluid through the bore and around the drill bit, the drilling fluid comprising a noncompressible base liquid having a density no greater than 0.8, and (c) removing drill cuttings from the bore with the drilling fluid. Further, the invention includes (d) determining pore pressure around the bore and controlling the pressure of the noncompressible drilling fluid as a function of the pore pressure around the bore.

As indicated in the Summary of the Invention, one novel fluid within my invention comprises two components: the above-described LWSHL liquid and a styrene-butadiene diblock copolymer. Another novel composition also has two components: the LWSHL and glass bubbles. Each of these novel compositions has practical limitations as a drilling fluid. The following detailed description relates the means for overcoming those practical limitations. One factor, however—heating of a composition containing the SB diblock copolymer—may be accomplished in any convenient manner, but my invention includes a particularly effective way of heating.

FIG. 1 is copied from my U.S. patent application Ser. No. 15/349,422, which utilizes the cavitation device for a different purpose. See also my U.S. Pat. No. 10,258,944, which is incorporated herein in its entirety by reference. Generally, cavitation is performed on a fluid, which may be a mixture and include liquids and solids. Cavitation effects are dependent on variables such as flow rate of the incoming materials, the viscosity and density of the fluid treated, and the rotational velocity of the cavitation rotor. I intend for the term "cavitation device" to include any device designed deliberately to induce cavitation in a fluid.

Referring now to FIG. 1, the liquid components including, for example, at least (a) the base lightweight liquid and (b) the SB diblock polymer comprising 0.1% to 5% by weight of the entering fluid, enters inlet 11 of a housing 12. The components can be comingled in the conduit leading to inlet 11, which will normally have a positive pressure from a pump or other source not shown. Within housing 12 is a rotor 18 that has a plurality of dead-end cavities shown in section 19a and surface openings 19b. Rotor 18 is mounted on a shaft 15, which is rotated by a motor not shown. In this version of the device, the incoming fluid first meets optional flow director 17 on the face of rotor 18, causing it to flow (spread evenly) to a cavitation zone 10 between the cylindrical surface of rotor 18 and the closely conforming internal surface of housing 20. In the cavitation zone 10, the fluid tends to fill the cavities 19 (both because of a positive pressure in inlet 11 and because the cavities tend to be empty) but is immediately expelled by centrifugal force from them, causing small vacuum pockets or low-pressure voids which are immediately and semi-violently filled. This constant physical violence causes excellent mixing and heating at the same time, followed by further turbulence as illustrated by the coiled arrows 14. The heated and mixed fluid exits from outlet 16 to its intended disposition; in this case, the fluid may be sent directly to a well for use in drilling. The two-component composition consisting of the LWSHL and the SB diblock copolymer produced in the cavitation device may be called a "single-phase" fluid. Its thixotropic and other rheological properties are still present after addition of other materials, such as glass bubbles, organoclay, surfactants, and drill cuttings.

The Kraton® product I use (SB diblock copolymer) requires 150° F. heat to yield completely. You could use a hot-oil unit, but the cavitation device reduces the heat required and has the further benefit of completely mixing and making the glass bubbles, if present, oilwet.

As indicated above, optionally, an organically modified phyllosilicate such as organoclay may be added to the incoming stream at inlet 11 in any convenient manner, and it will almost instantly be integrated into the mixture, lending its thixotropic attributes ready for use. Likewise, glass bubbles may be placed in the inlet 11 from any suitable upstream point.

A major purpose of drilling fluid is to carry the cuttings away from the drill bit. The drilling system is accordingly designed more or less continuously to send fluid down the well to the drill bit and draw it back up to the wellhead. There the cuttings are separated so the fluid can be reused. My invention provides for monitoring the density of the fluid or otherwise noting reductions in concentration of the glass bubbles, if present, and restoring the desired density by adding more glass bubbles.

Viscosity keeps the glass bubbles suspended in the GTL liquid and is needed for drilling. Viscosity can be added using styrenic diblock polymers such as those available from Kraton Corporation, but without further treatment, the resulting fluid is not thixotropic. A drilling fluid must be thixotropic (Bingham Plastic) having good plastic and viscosity and an acceptable yield point. Drilling is a start-stop process. Drilling deeper requires continually adding more lengths of drill pipe, and there can be other reasons the drilling process is stopped. The drilling fluid must be viscous enough to hold the cuttings from falling back onto the bit, but the yield point must be low enough that when you start pumping again you can maintain a low enough equivalent circulating density (ECD) and not overpressure the formation.

I have found that while one can make a stable, lightweight fluid using LWSHL liquid and a SB diblock copolymer (Kraton®) together with glass bubbles; it may not work for drilling because the fluid is not thixotropic enough. I have discovered that adding organoclay or other organically modified phyllosilicate in the proper combination with Kraton will make a thixotropic fluid that works well for drilling. The rheology can be further controlled with a surfactant to achieve the proper ECD as determined, for example, on the six and three readings using a FANN® 35 or equivalent viscometer. As the recirculation of fluid is monitored and adjusted for density, it may also be monitored and adjusted for a desired viscosity/rheology and to maintain the desired thixotropic properties by adjusting the concentration of SB diblock copolymer and/or the organoclay. Dispersants help to maintain the glass bubbles in a uniform suspension. A uniform dispersion or suspension has less viscosity and a lower ECD because friction between the glass bubbles is minimized. Further, surfactants such as those derived from fatty acids can lubricate the movement of the glass bubbles relative to one another.

The GTL based fluid described does not contain water. Water can hydrate clays and shales, complicating the drilling process. Water used for WBM and OBM often contains salts to lower water activity to keep water from imbibing into shales and clays. A non-aqueous fluid does not require salts and is by definition is less damaging.

By a styrene-butadiene diblock polymer, I mean a polymer that has discrete blocks of polymerized styrene and discrete components of polymerized butadiene. To the extent the unsaturated groups of the butadiene are not fully incorporated into the polymer matrix, at least some of the remaining pendant unsaturated groups may be hydrogenated. Similar diblock copolymers include blocks of polymerized styrene with isoprene; there may be circumstances where these products are useful also, and I intend to include them in the term "SB diblock copolymers" and similar terms used herein; the term includes copolymers in which isoprene is substituted wholly or partly for butadiene. Generally, the diblock copolymers described in U.S. Pat. Nos. 6,017,854 and 10,053,609 (mentioned above) and which are both hereby incorporated herein in their entireties by reference may be useful in various circumstances within the scope of my invention. All such polymers are intended to be included in the term "styrene butadiene diblock copolymers," Kraton®, and similar terms used herein, such as "SB diblock copolymers."

Shell GTL lightweight liquids may be used as the lightweight natural gas derivative. These liquid materials are very lightweight (I use such liquids having a density no greater than 0.8, better yet no greater than 0.75) and contain no more than a very small amount of naphthenic and other cyclic compounds. Shell GTL fluids are defined as a synthetic hydrocarbon, not a petroleum distillate, by the Environmental Protection Agency (EPA), i.e., a synthetic drilling base liquid is produced by the reaction of chemical feedstocks, as opposed to the traditional base fluids such a diesel and mineral oil which are derived from crude oil.

EPA Definition of Synthetic:
Drilling fluid produced by the reaction of purified chemical feedstocks, as opposed to the traditional base fluids such as diesel and mineral oil which are derived from crude oil solely through physical separation processes
  Synthetic Base Fluids: Includes synthetic paraffins (e.g., SARALINE™ 185V), olefins, and vegetable esters
  Traditional Base Fluids: Diesel and conventional mineral oils made from crude oil in refinery processes. Includes low-toxicity mineral oils (LTMOs) such as ESCAID™ 110 and DW-99.
  Manufacture of the GTL liquid is described in Hoek et al US patent publication 2015/0322351. In paragraphs 12-21 of that publication, the GTL liquid is described as a hydrogenated mixture of light hydrocarbons typically having 5 to 20 carbon atoms obtained following a Fischer-Tropsch treatment of natural gas. In particular, the publication mentions three different fractions— those having C5-C8, C9-C13, and C14-C20. In my invention, I may use as my base liquid any hydrocarbon liquid mixture (or a single one) within the range of 5 to 25 carbon atoms, whatever its source, having a density no greater than 0.8. Preferably they are substantially fully hydrogenated. Any such liquid, from any source (that is, whether or not synthesized) is intended to be included in the term Light Weight Synthetic Hydrocarbon Liquid (LWSHL).

Thus, my drilling fluid employs as a carrier or base a "light weight synthetic hydrocarbon liquid," or LWSHL, and this term will be used in the claims while reserving "fluid" for the drilling fluid. The geometric term "hollow spheres" used below to calculate volume refers to the volume occupied by hollow glass bubbles. "Glass bubbles" means hollow glass bubbles. Note also that the terms "noncompressible" and "incompressible" referring to the fluid does not imply that any volume lost by attrition of the glass bubbles is meant to be attributed to loss of volume by compression.

Fluid Density Calculations:
For 1 gram (gms) of lightweight fluid, you would have 0.7 gms LWSHL and 0.3 gms hollow spheres.
The volume of the LWSHL: 0.70 gms/0.76 gms/cc=0.921 cc (49.54%).
The volume of the hollow spheres: 0.30 gms/0.32 gms/cc=0.938 cc (50.46%).
The total volume of the lightweight fluid: 0.921 cc+0.938 cc=1.859 cc.
The density of the lightweight fluid: 1.0 gms/1.859 cc=0.538 gms/cc.
The density in units of lbs./gal: 0.538 gms/cc×8.34=4.49 lbs./gal.
To make up a 350 cc lab barrel multiply everything by 350 cc/1.859 cc=188.27.
Conversely, the equations can be manipulated to calculate the weight of glass bubbles required to make a specific weight of mud. For example, to make a 6 ppg drilling fluid using the two components:
The density in gms/cc—6 ppg/8.34 ppg=0.72 gm/cc
The weight of glass spheres required—0.72=(x(0.75))+((1−x)(0.32))

Figure 2:
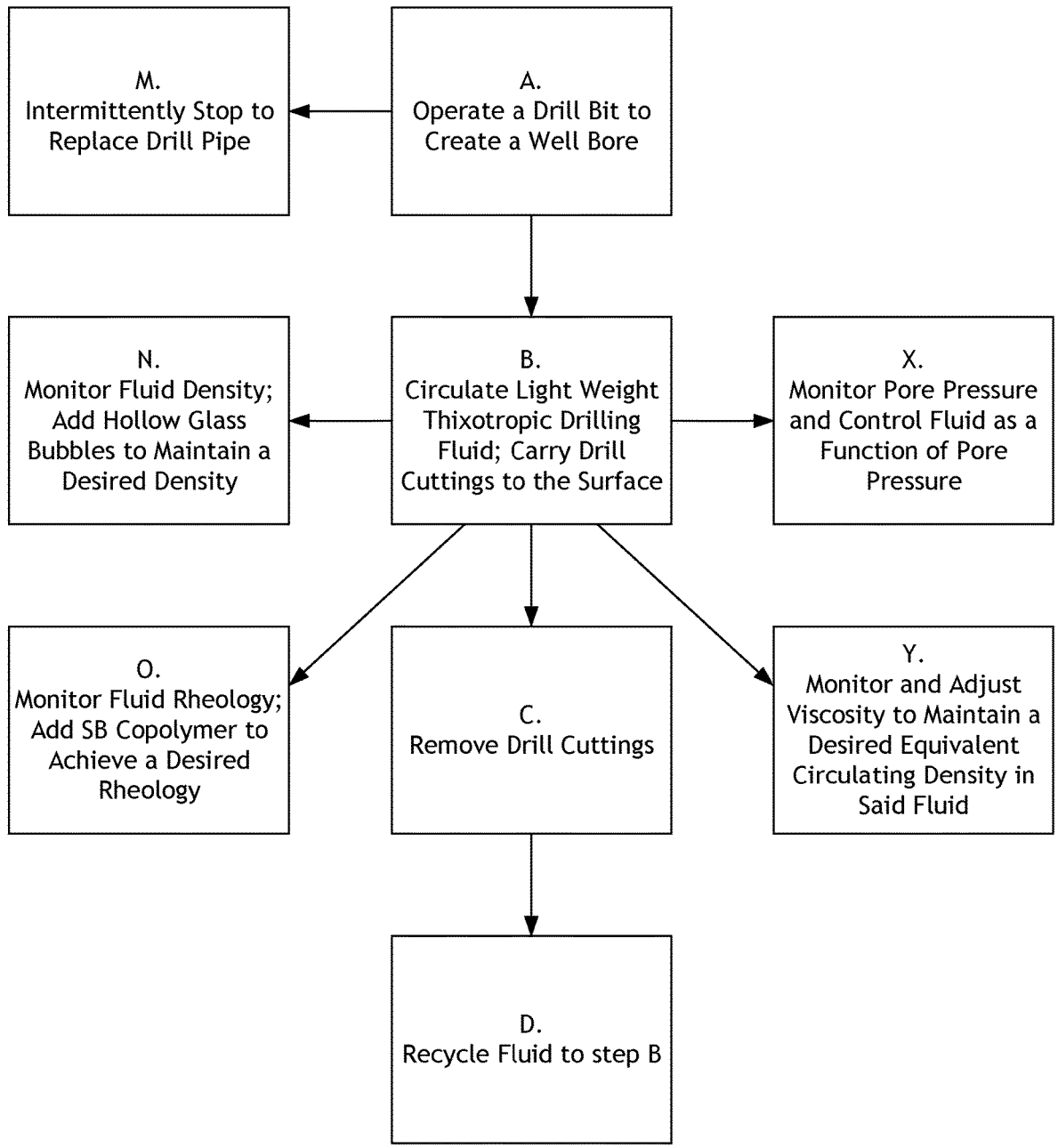
FIG. 2 is a block diagram of a process for managed pressure drilling using my novel drilling fluid, including the maintenance of desired density, equivalent circulation density, rheology and/or viscosity.

Referring now to FIG. 2, the process block diagram describes the relationships of the various steps of Managed Pressure Drilling using my light weight drilling fluid including hollow glass bubbles. In the basic steps of the central column, the process includes (A) the operation of a drill bit to create a well bore, (B) the circulation in the well of a noncompressible light weight synthetic hydrocarbon drilling fluid based on LWSHL to carry drill cuttings to the surface, (C) removing the drill cuttings from the fluid on the earth's surface, and (D) recycling the drilling fluid.

The process may include, as shown in the left column, (M) intermittently stopping the drilling to add drill pipe, (N) monitoring the fluid density and adding glass bubbles to regulate density, notably to replace glass bubbles lost by attrition, and (O) monitoring fluid rheology and adding SB copolymer as needed to maintain a desired rheology. Operators may expect to see perhaps 5% to 15% of the glass bubbles, more or less, destroyed during a trip to the bottom of the well and back, caused by pressure, grinding, and abrasion with each other as well as with piping and parts encountered. Whatever the circumstance (and the strength of the glass bubbles may be improved in the future), the broken particles may be removed on the surface in step N by a centrifuge, for example, and the lower density restored by intermittent or continuous replacement of new glass bubbles.

In the right column, (X) as part of a Managed Pressure Drilling process, pore pressure may be monitored and drilling fluid pressure regulated as a function of pore pressure, and (Y) viscosity may be monitored and adjusted to maintain a desired equivalent circulating density.

Test Results

Various mixtures of LWSHL and KRATON™ 8703, and LWSHL with hollow glass bubbles were prepared and tested for rheology. Generally, adding KRATON™ 8703 alone does not give the required drilling properties. Those skilled in the art will realize that, in this formulation, 4 wt. % KRATON™ 8703 is not enough to make a practical drilling fluid and 4.5 wt. % KRATON™ 8703 is too much.

TABLE 1

Viscosity Measurements of KRATON ™ 8703 in Shell GTL Fluid

| Dial Reading OFITE | Concentration of KRATON ™ 8703 | | | | |
|---|---|---|---|---|---|
| Model 900 @ 120° F. | 2 wt. % | 3 wt. % | 4 wt. % | 4.5 wt. % | 5 wt. % |
| 600 | 21 | 29 | 75 | 191 | 187 |
| 300 | 10 | 15 | 44 | 129 | 134 |
| 200 | 7.2 | 12 | 33 | 106 | 113 |
| 100 | 3.5 | 7 | 20 | 76 | 85 |
| 6 | 0.6 | 1 | 3 | 27 | 33 |
| 3 | 0.5 | 0.8 | 2 | 23 | 29 |
| PV, cP | 11 | 14 | 31 | 62 | 63 |
| YP, lb/100 ft$^2$ | 0 | 1 | 13 | 67 | 71 |
| 10 sec gel, lb/100 ft$^2$ | 0.5 | 0.7 | 2 | 21 | 29 |
| 10 min gel, lb/100 ft$^2$ | 0.5 | 0.7 | 2 | 21 | 29 |

A series of tests were performed to improve the drilling fluid rheology using KRATON™ 8703, and it was found that an organoclay combined with KRATON™ 8703 gives the required drilling rheology. Most organoclays will act similarly, but I found that CLAYTONE® EM works better in the Shell GTL liquid (Gas to Liquid, also seen herein as LWSHL). A suspension test can be performed to determine the best clay. That is, visually determine what organoclay mixes easiest in Shell GTL liquid. Base 1 and Base 2 show the rheology of the KRATON™ 8703/CLAYTONE® EM mix. Those skilled in the art will realize the Base 2 is a better drilling fluid. Furthermore, adding both KRATON™ 8703 and CLAYTONE® EM provides two mechanisms to adjust the base mud properties. Items beginning with HG are hollow glass bubbles.

TABLE 2

| Product | Base 1 | Mix 1 | Mix 2 | Base 2 | Mix 3 | Mix 4 | Mix 5 | Mix 6 |
|---|---|---|---|---|---|---|---|---|
| GTL GS 190 | 97%/200 g | 90%/200 g | 90%/200 g | 94%/200 g | 89%/200 g | 89%/200 g | 89%/200 g | 89%/200 g |
| KRATON™ 8703 | 1.5%/3 g | 2%/4 g | 2%/4 g | 3%/6 g | 3%/6 g | 3%/6 g | 3%/6 g | 3%/6 g |
| CLAYTONE® EM | 1.5%/3 g | 3%/6 g | 3%/6 g | 3%/6 g | 3%/6 g | 3%/6 g | 3%/6 g | 3%/6 g |
| HGS7K32 | — | 5%/11 g | 5%/11 g | — | 5%/11 g | 5%/11 g | 5%/11 g | 5%/11 g |
| Propylene Carbonate | — | — | 1 ml | — | — | — | — | — |
| Glycerol | — | — | — | — | — | 1 ml | — | — |
| POE (2) | — | — | — | — | — | — | — | 0.25 ml |

TABLE 3

Rheology

| Dial Reading OFITE Model 900 @ 120 F. | Base 1 | Mix 1 | Mix 2 | Base 2 | Mix 3 | Mix 4 | Mix 5 | Mix 6 |
|---|---|---|---|---|---|---|---|---|
| 600 | 27 | 27 | 19 | 38 | 56 | 93 | 51 | 49 |
| 300 | 16 | 18 | 11 | 26 | 38 | 72 | 39 | 33 |
| 200 | 12 | 14 | 8 | 20 | 31 | 63 | 32 | 27 |
| 100 | 7 | 10 | 5 | 16 | 22 | 51 | 26 | 19 |
| 6 | 1.5 | 5 | 0.2 | 4 | 7 | 29 | 17 | 6 |
| 3 | 1.3 | 5 | 0.2 | 3.5 | 5.5 | 28 | 15 | 5 |
| PV, cP | 11 | 9 | 8 | 12 | 18 | 21 | 12 | 16 |
| YP, lb/100 ft$^2$ | 5 | 9 | 3 | 14 | 20 | 51 | 27 | 19 |
| 10 sec gel, lb/100 ft$^2$ | 1.5 | 5 | 0.3 | 4 | 6 | 28 | 15 | 7 |
| 10 min gel, lb/100 ft$^2$ | 1.7 | 7 | 0.5 | 5 | 7 | 30 | 18 | 10 |
| Specific Gravity | 0.75 | 0.70 | 0.71 | 0.75 | 0.71 | 0.71 | 0.72 | 0.71 |

Adding glass bubbles to the mix changes fluid rheology. The combination of KRATON™ 8703/CLAYTONE® EM in Base 1 makes a good drilling fluid, but in Mix 1 using Base 1, the glass bubbles do not stay in suspension. Base 2 had better rheology but adding just 5% (by weight) glass bubbles made the fluid too viscous. Surprisingly, adding a surfactant in Mix 6 or propylene carbonate in Mix 2 thinned viscosity and yielded a drilling fluid. Conversely, adding glycerin in Mix 4 boosted viscosity. The same boosted viscosity has been noted with a polyethylene glycol such as PEG 200. Likely, other surfactants and solvents will thin viscosity whereas other additives, like glycerol, will thicken the drilling fluid.

A preferred drilling mud formula will include a combination of KRATON™ 8703, CLAYTONE® EM, and surfactant with hollow glass bubbles. The fluid rheology tests can easily be performed at the rig site using a Couette-type viscometer such as a FANN® 35 or OFTIE 900.

Surfactants are also useful in the fluid because likely water will be encountered while drilling. The surfactant will be needed to emulsify water from the formation or elsewhere into the drilling fluid so that it does not increase the solids loading or create a "cottage-cheese" type fluid that no longer carries cuttings from the drill bit back to the surface.

GTL is completely non-polar. Propylene carbonate adds polarity to the system and is often used in OBM to help hydrate organoclays. Surprisingly we found it also boosts the performance of Kraton® in GTL, likely by adding polarity. Testing was done with a Brookfield viscometer. As seen in Table 4, 1% propylene carbonate is the optimal concentration in these tests, and it boosts viscosity by about ⅓. That means we can use less Kraton® to keep the bubbles suspended. Other viscosity-thinning dispersants known in the well drilling art may be useful also; a diethoxy oleoyl amine has been found effective in the invention.

TABLE 4

| Product | Brookfield DV2T/ Spindle 62/RPM 20 Viscosity, Cp |
|---|---|
| 3% Kraton G1701 | 1047 |
| 3% Kraton G1702 | 1481 |
| 3% Kraton G8705 | 1059 |
| 3% Kraton G8702 | 1530 |
| 0.5% Propylene Carbonate + 3% G8702 | 1800 |
| 1% Propylene Carbonate + 3% G8702 | 2556 |
| 2% Propylene Carbonate + 3% G8702 | 2500 |
| 1% Propylene Carbonate + 3% Claytone ® SF | 2500 |

Hollow glass bubbles are available commercially from 3M ranging in nominal density from 0.28 to 0.6 glee, in a range of diameters and crush strengths useful in the invention. The ability of glass bubbles to impart additional low density to a light weight drilling fluid base liquid was highlighted by comparing two different volume percentages of glass bubbles in Shell GTL and in Diesel oil. Diesel oil has a lower density than water but GTL's density is significantly lower than Diesel. The 0.2 specific gravity difference between Diesel and Shell GS-190 equals 1.66 ppg.

Two GTL samples, each containing 3% Kraton®, were made, as shown in Table 5; the Kraton was included in the weight of the GTL (GS-190) for the calculations.

TABLE 5

|  | Density (g/cc) | Weight % | Volume % |
|---|---|---|---|
| Shell GS-190 base liquid | 0.75 | 81.5 | 65.27 |
| HGS7K32 | 0.32 | 18.5 | 34.73 |
|  |  | 100 | 100 |
| Formulation density: 5 ppg | | | |
| Shell GS-190 base liquid | 0.75 | 71.5 | 57 |
| HGS7K32 | 0.32 | 28.5 | 43 |
|  |  | 100 | 100 |

This formulation also had a density of 5 ppg after being subjected to a pressure of 7000 psi.

The invention claimed is:

1. A low density noncompressible drilling fluid comprising (a) a water-free lightweight synthetic hydrocarbon liquid having a density no greater than 0.8 g/cc, (b) 5% to 60% by volume glass bubbles and (c) 1% to 5% by weight of a styrene butadiene diblock copolymer.

2. The low density noncompressible drilling fluid of claim 1 including (d) 1% to 5% by weight organically modified phyllosilicate.

3. The low density noncompressible drilling fluid of claim 2 having a density no greater than 0.75 g/cc.

4. The low density noncompressible drilling fluid of claim 1 having a density no greater than 0.75 g/cc.

5. The low density noncompressible drilling fluid of claim 1 including (d) an amount of dispersant effective for viscosity thinning of said drilling fluid.

6. The low density noncompressible drilling fluid of claim 5 wherein said dispersant comprises propylene carbonate, oleoyl amine with 2 moles of ethylene oxide, or a mixture thereof.

7. The low density noncompressible drilling fluid of claim 5 including (e) 1% to 5% by weight organically modified phyllosilicate.

8. The low density noncompressible drilling fluid of claim 1 including (d) a surfactant in an amount effective to emulsify at least some water from a formation in contact with said drilling fluid.

9. The low density noncompressible drilling fluid of claim 5 having a density no greater than 0.75 g/cc.

* * * * *